United States Patent Office 3,271,415
Patented Sept. 6, 1966

3,271,415
PREPARATION OF 1-HYDROXY-3-AMINO-PYR-ROLIDONE-2 AND DERIVATIVES THEREOF
Willem Jacob van der Burg, Oss, Netherlands, assignor to Organon Inc., West Orange, N.J., a corporation of New Jersey
No Drawing. Filed Feb. 11, 1965, Ser. No. 432,003
Claims priority, application Netherlands, Mar. 7, 1964, 6,402,375
2 Claims. (Cl. 260—326.5)

The invention relates to the preparation of 1-hydroxy-3-amino-pyrrolidones-2 by cyclisation of α-amino-γ-halo-butyro-hydroxamic acid by means of a strongly basically reacting substance.

The said pyrrolidone derivative is a valuable compound acting strongly on the central nervous system (see Netherlands patent application Nr. 275,964). It was prepared first by J. Smrt et al. (see Coll. Czechoslow. Chem. Comm. 24, 1672 (1959)), who obtained this substance by cyclisation of a γ-halo-2-amino-butyro-hydroxamic acid by means of sodium hydroxide, tertiary amines or strongly basically anion exchanging substances. They obtained with N-ethyl piperidine a yield of 35%, with sodium hydroxide 43% and with an ion exchanger (IRA–400) a yield of 82% it is true, but in the first place an impure product was obtained with the latter reagent with a melting point of 151–155° C. instead of 182–184° C., so that it had to be purified further, and in the second place the use of an ion exchanger in the preparation of large quantities of substance is less practical.

Surprisingly a process has been found now for the preparation of the 1-hydroxy-3-amino-pyrrolidone-2 and derivatives thereof by cyclisation of an α-amino-γ-halo (or sulfonyloxy)-butyro-hydroxamic acid and functional derivatives and substitution products thereof with a strongly basically reacting substance, characterized in that lithium hydroxide is used.

Thus the desired pyrrolidone derivative can be prepared in a most simple manner with yields of over 80%.

An advantage of the process according to the invention is that the ring closure can be effected in very high concentration thanks to the great solubility of the lithium salts formed in the reaction medium. After filtration from the reaction mixture the crystalline final product may further be liberated quantitatively from the lithium salt by washing it with organic solvents, such as ethanol and ether, in which the salt dissolves readily, but the pyrrolidone derivative poorly or not at all. These advantages result in appreciably higher yields than the known methods. Schematically the ring closure may be represented as follows:

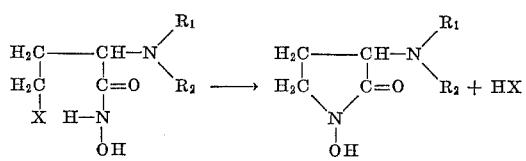

in which

X represents a halogen atom or an alkyl, aryl or aralkyl-sulfonyloxy group $R_1$ and $R_2$ are identical or different and may represent H, an alkl, acyl, aryl or aralkyl group, or $R_1$ and $R_2$ may form a heterocyclic ring system with the adjacent N-atom.

Futher the hydrogen atoms of the α, β and γ-C-atom may be substituted for example by an alkyl group, a cycloalkyl group, an amino group and a hydroxyl group.

As examples of the halogen atom in γ-position in the hydroxamic acids are mentioned Cl, Br and I; of the sulfonyloxy groups which can replace the halogen, the mesyloxy- or tosyloxy group is preferably applied.

As starting product the α-amino-γ-bromo-butyro-hydroxamic acid is preferably selected from the γ-halo derivatives. The starting product being less stable in a dissolved state, the ring closure is preferably performed below room temperature, and that in an aqueous solution of lithium hydroxide. After completion of the conversion an acid, preferably glacial acetic acid, is added to the reaction mixture for neutralisation, when the final product separates in a crystal form.

As examples of starting products are mentioned:

α-amino-γ-bromo-butyro-hydroxamic acid
α-benzyl-amino-γ-iodo-butyro-hydroxamic acid
α-dibenzyl-amino-γ-chloro-butyro-hydroxamic acid
α-benzyloxy-carbonyl-amino-γ-chloro-butyro-hydroxamic acid
α-acetyl-amino-γ-tosyl-butyro-hydroxamic acid
α-phathalimido-γ-tosyl-butyro-hydroxamic acid
α-dimethyl-amino-γ-bromo-butyro-hydroxamic acid
α-acetyl-amino-γ-cyclohexyl-γ-chloro-butyro-hydroxamic acid
α-benzoylamino-γ-bromo-butyro-hydroxamic acid
α-morpholino-γ-chloro-butyro-hydroxamic acid
α-amino-γ-dimethyl-γ-chloro-butyro-hydroxamic acid

Example I

In 220 ml. of distilled water are dissolved 48 gm. of $LiOH.H_2O$. In a period of 20 minutes 117 gm. α-amino-γ-bromo-butyro-hydroxamic acid are added dropwise, maintaining the temperature at 0–5°. Next the reaction mixture is stirred at this temperature for 15 minutes and finally at room temperature for one hour. To the clear solution obtained now 45 ml. of glacial acetic acid are added dropwise, again while cooling, when the 1-hydroxy-3-amino-pyrrolidone-2 separates in colourless crystals. After standing for 1 hour at 0–4° C. the crystals are sucked off. The crystal cake is washed with ethanol and after that with ether. The product is dried in vacuo at 50° C. and then weighs 58.2 gm. (84.5% of the theory). Melting point: 175–179° C. The product obtained is recrystallized again by dissolving it in 225 ml. of hot water and next adding 280 ml. of 96% alcohol. After cooling to 5° C. and sucking off the 1-hydroxy-3-amino-pyroroli-done-2 is obtained in a yield of 56.1 gm., which is 81.5% of the theoretically possible quantity. Melting point of this purified preparation: 182–183° C.

Example II

By the method of Example I the 1-hydroxy-3-acetyl-amino-pyrrolidone-2 was obtained in a yield of 82% starting from the α-acetyl-amino-γ-chloro-butyro-hydroxamic acid. Melting point: 149.5–150.5° C.

Example III

In the above manner the 1-hydroxy-3-dimethyl-amino-pyrrolidone-2 was obtained in a yield of 84% starting from α-dimethyl-amino-γ-bromo-butyro-hydroxamic acid. Melting point: 125–126° C.

Example IV

By the above method the 1-hydroxy-3-acetyl-5-dimethyl-pyrrolidone-2 was prepared starting from α-acetyl-amino-γ-dimethyl-γ-bromo-butyro-hydroxamic acid, Yield: 83.5%. Melting point: 192–193° C.

Example V

By the process of the invention the 1-hydroxy-3-amino-5-methyl-pyrrolidone-2 was obtained in a yield of 86.2% starting from α-amino-γ-methyl-γ-chloro-butyro-hydroxamic acid. Melting point: 135–136° C.

Example VI

By the method of the invention the α-acetyl-amino-γ-cyclohexyl-γ-chloro-butyro-hydroxamic acid was converted into the 1-hydroxy-3-acetyl-amino-5-cyclohexyl-pyrrolidone-2. Yield: 83.5%. Melting point: 185–188° C.

Example VII

By the method of Example I 1-hydroxy-3-amino-pyrrolidone-2 was obtained in a yield of 80.5%, starting from α-amino-γ-tosyloxy-butyro-hydroxamic acid.

Example VIII

Starting from α-amino-γ-mesyloxy-butyro-hydroxamic acid 1-hydroxy-3-amino-pyrrolidone-2 was obtained by the process of Example I in a yield of 81.2%.

I claim:

1. Process for the preparation of 1-hydroxy-3-amino-pyrrolidone-2 and derivatives thereof which comprises the cyclisation of a hydroxamic acid of the formula:

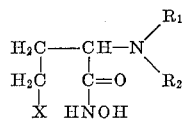

in which

X is selected from the group consisting of halogen, lower alkyl sulfonyloxy, benzene sulfonyloxy and tosyloxy, and $R_1$ and $R_2$ are selected from the group consisting of hydrogen, lower alkyl, lower aliphatic carboxyl, benzoyl and benzyloxycarbonyl, benzyl and taken together with the adjacent N atom form a heterocyclic ring selected from the group consisting of a phthalimide and a morpholine ring, and the hydrogen atoms of α, β, and γ-C-atom may be substituted by lower alkyl, cyclohexyl, amino and hydroxyl, by means of lithium hydroxide.

2. The process of claim 1 in which α-amino-γ-bromo-butyro-hydroxamic acid is used as starting material.

No references cited.

ALEX MAZEL, *Primary Examiner.*

HENRY R. JILES, *Examiner.*

JOSEPH A. NARCAVAGE, *Assistant Examiner.*